No. 728,321. PATENTED MAY 19, 1903.
C. P. STEINMETZ.
SYSTEM OF ELECTRICAL DISTRIBUTION.
APPLICATION FILED JAN. 2, 1901.

NO MODEL.

Witnesses.
John Ellis Glenn
Benjamin B. Hull

Inventor
Charles P. Steinmetz
by Albert G. Davis
Atty.

No. 728,321. Patented May 19, 1903.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 728,321, dated May 19, 1903.

Application filed January 2, 1901. Serial No. 41,805. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, of which the following is a specification.

My present invention is embodied in a means for deriving a constant current from a source of alternating current of constant potential. The invention may, however, be operated in the reverse manner, constant current being supplied and multiphase alternating current of constant potential derived therefrom.

According to one mode of carrying out my invention I connect across two multiphase mains a circuit having in series therein reactances of opposite sign—such, for example, as an inductance and a condenser—these reactances being of equal value—that is to say, such that when traversed by current of the same value the electromotive force across the terminals of one is equal to that across the terminals of the other. This is the relation corresponding to resonance, as will readily be understood. The constant-current circuit is connected to the junction of these two reactances and to another of the multiphase mains.

The spirit of the invention may be embodied in widely diverse arrangements of the general character specified, some of which are described below and their features of novelty pointed out in connection with the accompanying drawings, in which—

Figure 1:
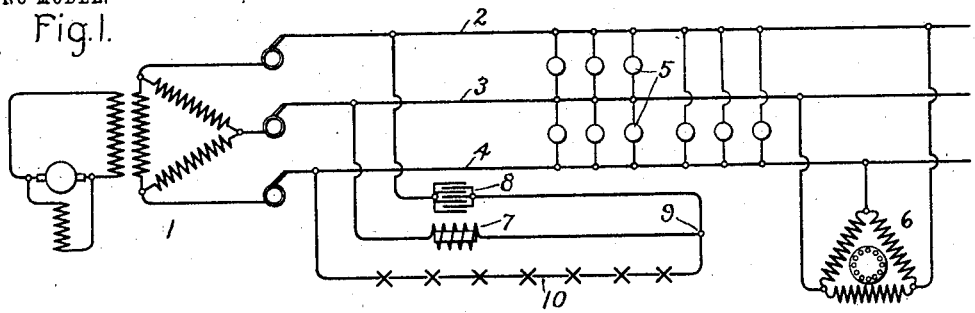
Figure 2:
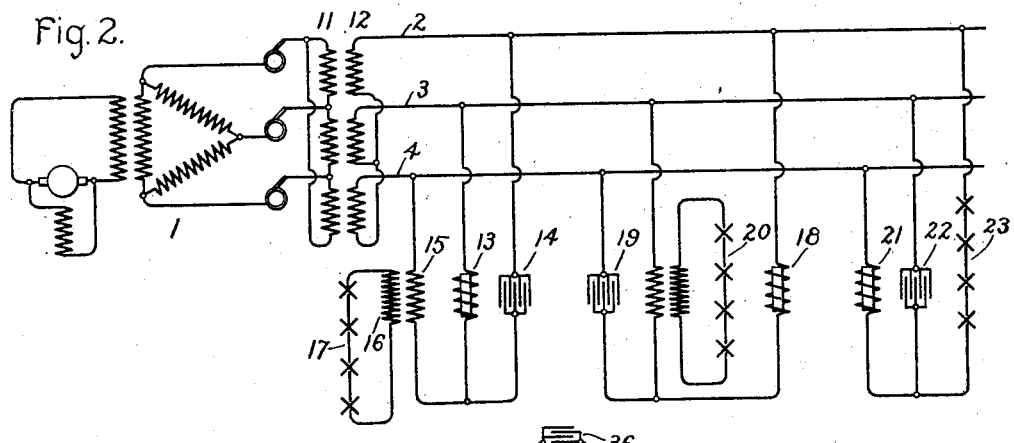
Figure 3:
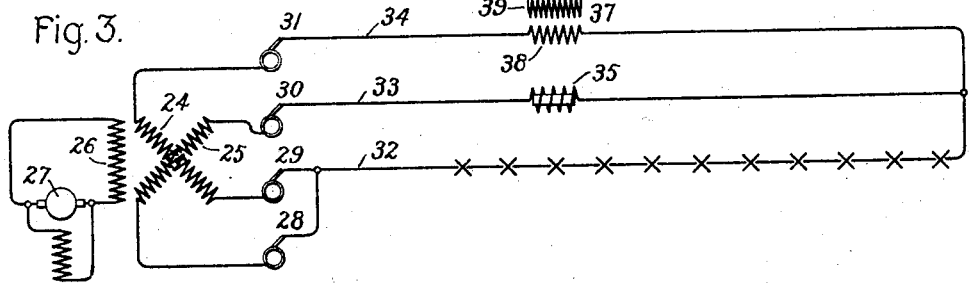

Figure 1 represents a three-phase source of multiphase current from which a single constant-current circuit is derived. Fig. 2 shows a plurality of constant-current circuits derived from a single source of three-phase current. Fig. 3 shows the arrangement in connection with a quarter-phase machine, and Fig. 4 an arrangement in which reversely-related constant-potential constant-current transforming devices are fed from the quarter-phase machine.

In Fig. 1 a source of three-phase current of any usual form is indicated conventionally at 1, and connected to the terminals of this source are the mains 2, 3, and 4, between which multiphase electromotive forces are maintained. These mains may supply translating devices of any usual or desired character—such, for example, as lamps 5 and the three-phase induction-motor 6. Across two of these multiphase mains, between which in the present instance three-phase electromotive forces are maintained, I connect an inductance-coil 7 and a condenser 8 in series with each other. These reactance devices are connected across the mains 2 and 3 and should be proportioned so that they have equal reactive electromotive forces. The junction 9 between these reactance devices is connected to one end of a circuit 10, the other end of which is joined to the remaining three-phase main 4. With the reactance devices proportioned with respect to each other in the manner specified the electromotive force across the terminals of either reactance is in quadrature to that across the mains 2 3, between which these reactances are connected. The circuit 10 being connected to the junction of the reactances and to the remaining three-phase main 4 serves as a means for combining the quadrature reactance electromotive forces with the constant resultant electromotive force of phases 2 4 and 3 4 of the three-phase system. The reactance electromotive forces vary, so as to preserve a constant current in the circuit 10 regardless of the load. The constant electromotive forces mentioned extend the range and improve the regulation of the constant current.

Fig. 2 represents an amplification of the arrangement shown in Fig. 1. In this case the source of three-phase current 1 is connected to the three-phase mains 2, 3, and 4 through a set of transformers having the primary windings 11 connected in delta relation to each other and the secondary windings 12 in Y or star relation. The result of this connection is that the secondary electromotive forces are combined in phase relations with respect to each other different from those existing between those of the primary impressed electromotive forces. The secondary electromotive forces being intermixed in the manner described cause the third and ninth harmonics of the impressed alternating current, provided these harmonics be present, to cancel out and largely reduce the fifth and seventh harmonics if present. The use of transformers connected as thus described therefore acts to smooth out any irregularities in the wave form of the alternating-current supply, and this has a peculiar advantage in connection with constant-potential constant-current transforming devices of the general character described, since in such devices at light loads any harmonics present in the impressed-electromotive-force wave appear in the current-wave at exaggerated values, thus impairing the constant-current regulation.

Across the mains 2 3 in Fig. 2 I connect an inductance-coil 13 and a condenser 14 in series with each other, the junction of the two being connected through the primary 15 of a step-up transformer to the remaining main 4. The secondary 16 of this transformer supplies current to a circuit 17, which in this case is traversed by constant current in the same manner as the circuit 10 in Fig. 1. The transformer thus described, as well as others performing similar functions, may be proportioned so that its core saturates at or near full load, thereby preventing the occurrence of excessive electromotive forces upon the constant-current circuit in event of an overload or open circuit. A second transforming apparatus is connected across the same mains 2 3 4, the connections, however, being altered so that the inductance-coil 18 and the condenser 19 of this transforming apparatus are not joined, respectively, to the same supply-mains—that is to say, the inductance-coil 18 is connected to the main 2 and the condenser to the main 4, while in the first set the condenser 14 was connected to the main 2 and the inductance-coil 13 to the main 3. The constant-current consumption-circuit 20 is inductively connected to the remaining main 3, as shown. A third constant-potential constant-current transforming device consisting of the inductance-coil 21 and the condenser 22 and the constant-current circuit 23 is also cooperatively related to the mains 2, 3, and 4, the connections of the various elements mentioned being, however, made so as not to correspond with either of the modes of connection of the first two transforming sets. It will thus be seen that each of the mains 2, 3, and 4 is connected to the condenser of one transforming set, the inductance-coil of another transforming set, and the constant-current circuit of the third set. The result is the prevention of the transfer of power between the phases and consequent unbalancing which would take place at light loads were one transforming apparatus or set only employed.

Fig. 3 shows the invention as applied to a quarter-phase source of current. In this case the two generating-windings of the source are represented at 24 and 25, the exciting-winding of the machine (indicated at 26) being supplied with current from any suitable source—such, for example, as the exciter 27. The four terminals of the quarter-phase source are represented at 28, 29, 30, and 31, respectively. Two of these terminals—as, for example, the terminals 28 and 29—are joined together, so that the main 32, connected to the junction thereof, forms a common return for the mains 33 and 34, connected to the remaining terminals 30 and 31. In series with the main 33 I place an inductance-coil 35, while operatively related to the main 34 is a condenser 36, the connection of the condenser in this case being made through a transformer 37, the primary winding 38 of which has a smaller number of turns than the secondary winding 39. By this arrangement a smaller condenser can be used than if the condenser were interposed directly in series in the main 34. The reactive electromotive forces due to the inductance-coil 35 and the primary 38, operatively related to the condenser 36, are proportioned so as to be equal, but opposite in effect, the relation corresponding to that of resonance. Due, however, to the presence of the circuit 32, which is connected to the junction of the inductance-coil 35 and the primary 38 of the transformer 37, complete resonance does not take place except upon the opening of the circuit 32. With the proportioning of parts mentioned the electromotive force acting upon the circuit 32 varies with the load in such a manner as to maintain a constant current therein, the action being the same in principle as that described above in connection with Fig. 1.

Figure 4:
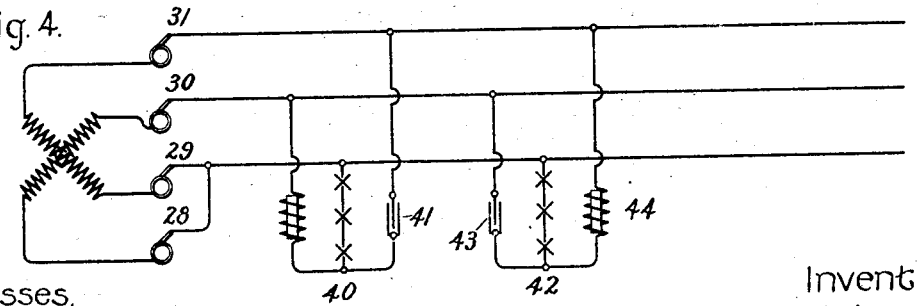

Fig. 4 represents substantially the same relation as Fig. 3, except that two reversely-arranged transforming devices are shown as connected to the three-phase terminals 29, 30, and 31. The transforming device 40 is connected in the same manner as the transforming arrangement shown in Fig. 3, the only difference being that the condenser 41 is connected directly in one of the branches instead of indirectly through a transformer, as shown in Fig. 4. With a single constant-potential constant-current transforming device of the character described transfer of power between the phases occurs at light loads. It is therefore desirable to supply from the multiphase mains another transforming device or devices reversely connected with respect to the first, so as to equalize the load on the system. I have illustrated such an additional transformer device at 42, this arrangement being the same as that shown at 40 except that the connections of the condenser 43 and the inductance-coil 44 are reversed in position, the inductance-coil being connected to the main 31 and a condenser 43 of the main 30, the connections of the corresponding reactances in the transforming device 40 being exactly the reverse.

Wherever herein I speak of "reactances of opposite sign" I mean to include devices which possess the effect of capacity and inductance, respectively. For the purpose of illustration I have shown a condenser as typifying a device possessing capacity and an inductance-coil and typifying a device possessing inductance; but it will be evident to those skilled in the art that other devices possessing these same qualities may be employed—such, for example, as polarization-cells, transformers with open magnetic circuits, transformers wtih condensers in their secondaries, &c.

What I claim as new, and desire to secure by Letters Patent of the United States, is—

1. The combination of an alternating-current-supply circuit of variable electromotive force, a consumption-circuit, and a transformer constituting an inductive connection between the two circuits, the transformer being proportioned so that its core saturates at or near full load.

2. The combination with a source of variable electromotive force, of a consumption-circuit containing a variable number of translating devices, a transformer having one of its windings connected to said source and its other winding to said consumption-circuit, said transformer being proportioned so that its core saturates at or near full load on said consumption-circuit.

3. The combination of a source of three-phase current, three transformers having one set of windings connected in delta and another set in Y or star relation, connections between said source and one of said sets of windings, three-phase mains connected to the other set of windings, and constant-current mains connected to said three-phase mains.

4. The combination of a source of three-phase current, three transformers having one set of windings connected in delta and another set in Y or star relation, connections between said source and one of said sets of windings, three-phase mains connected to the other set of windings, and a constant-current circuit connected to said mains.

5. The combination of a source of three-phase current, three transformers having one set of windings connected in delta and another set in Y or star relation, connections between said source and one of said sets of windings, and translating devices fed with constant current from said mains.

6. The combination of multiphase alternating-current mains, a conductor leading from each of said mains to a common point, an energy-consuming device in circuit with one of said conductors, and reactances of opposite sign in operative relation to other conductors respectively.

7. The combination of multiphase supply-mains, a plurality of constant-current circuits, and connections between the constant-current circuits and the supply-mains such that the voltage impressed on one of the constant-current circuits is out of phase with that impressed on another of said constant-current circuits.

8. The combination of multiphase mains, conductors leading respectively from said mains to a common point, a condenser in operative relation to one of said conductors, an inductance device in operative relation to another of said conductors, and a third conductor constituting the seat of a constant current.

9. The combination of multiphase mains, conductors leading respectively from said mains to a common point, a condenser in operative relation to one of said conductors, an inductance device in operative relation to another of said conductors, and a third conductor including constant-current translating devices.

10. The combination of a source of three-phase current, three-phase mains connected therewith, and conductors leading from each of said mains to a common point, one of said conductors including a condenser, another an inductance device, and the third a power-consuming device.

11. The combination of a source of three-phase current, three-phase mains connected therewith, and conductors leading from each of said mains to a common point, one of said conductors including a condenser, another an inductance device, and the third a transformer the secondary of which is connected to a translating device or devices.

12. The combination of three alternating-current mains, a conductor leading from each of said mains to a common point, an inductance device in circuit with one of said conductors, a condenser in circuit with another of said conductors, and an energy-consuming device in circuit with the remaining conductor.

13. The combination of three-phase mains, a condenser and an inductance device in series across two of the mains, and a constant-current circuit deriving energy from a connection between the junction of the condenser and the inductance device and a point on the other main.

14. The combination of three-phase mains, reactances of opposite sign in series across two of the mains, and a constant-current circuit operatively connected between the junction of the reactances and the third main.

15. The combination of three alternating-current mains between which phase-displaced electromotive forces are maintained, reactances of opposite sign connected between two of the mains and a constant-current circuit operatively connected between a junction of two reactances and a point on the third main.

In witness whereof I have hereunto set my hand this 29th day of December, 1900.

CHARLES P. STEINMETZ.

Witnesses:
  BENJAMIN B. HULL,
  EDWARD WILLIAMS, Jr.